United States Patent
Boeckner et al.

(10) Patent No.: US 8,949,999 B2
(45) Date of Patent: Feb. 3, 2015

(54) ACCESS CONTROL AT A MEDIA SERVER

(75) Inventors: Bartholomew Alexander Boeckner, Brantford (CA); Joao Paulo Neves Francisco, Brampton (CA); Douglas Eugene Ross, Davie, FL (US)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/229,261

(22) Filed: Sep. 9, 2011

(65) Prior Publication Data
US 2012/0291119 A1 Nov. 15, 2012

Related U.S. Application Data

(60) Provisional application No. 61/484,484, filed on May 10, 2011.

(51) Int. Cl.
*G06F 17/30* (2006.01)
*G06F 12/00* (2006.01)
*G06F 21/62* (2013.01)

(52) U.S. Cl.
CPC ................................ *G06F 21/6218* (2013.01)
USPC ........ 726/27; 726/4; 726/17; 726/21; 726/26; 726/28; 726/29; 726/30

(58) Field of Classification Search
CPC .............. H04L 41/509; H04L 61/1523; H04L 67/2842; G06F 12/0817; G06F 17/30011; G06F 17/30067
USPC ...................................... 726/17, 4, 21, 26–30
See application file for complete search history.

(56) References Cited

U.S. PATENT DOCUMENTS

| | | | |
|---|---|---|---|
| 7,698,468 B2 | 4/2010 | Hwang | |
| 7,882,356 B2 | 2/2011 | Klemets et al. | |
| 2004/0249885 A1* | 12/2004 | Petropoulakis et al. | 709/204 |
| 2006/0020736 A1* | 1/2006 | Jackson | 710/313 |
| 2006/0048143 A1* | 3/2006 | Chao et al. | 717/177 |
| 2006/0123248 A1* | 6/2006 | Porter et al. | 713/193 |
| 2006/0253698 A1* | 11/2006 | Mate et al. | 713/151 |

(Continued)

FOREIGN PATENT DOCUMENTS

| | | |
|---|---|---|
| WO | 2005003933 A1 | 1/2005 |
| WO | 2006018781 A1 | 2/2006 |

OTHER PUBLICATIONS

Extended European Search report mailed Jun. 20, 2012, in corresponding European patent application No. 11180713.7.

(Continued)

*Primary Examiner* — Joseph P Hirl
*Assistant Examiner* — Kalish Bell
(74) *Attorney, Agent, or Firm* — Novak Druce Connolly Bove + Quigg LLP

(57) ABSTRACT

A method, system and apparatus for controlling access to a media server are provided. A browse request is received at a computing device, from a remote computing device to browse a memory structure including content files. Authentication of the remote computing device is initiated. Prior to the remote computing device being authenticated, a response is transmitted to the remote computing device indicative that the memory structure is empty of the content files, regardless of actual content of the memory structure. After the remote computing device is authenticated, a further response is transmitted to the remote computing device indicative of the actual content of the memory structure.

12 Claims, 22 Drawing Sheets

(56) References Cited

U.S. PATENT DOCUMENTS

| | | |
|---|---|---|
| 2007/0022091 A1 | 1/2007 | Styles et al. |
| 2007/0156899 A1* | 7/2007 | Yoon et al. .................... 709/225 |
| 2008/0288586 A1* | 11/2008 | Koch ............................ 709/203 |
| 2009/0164681 A1* | 6/2009 | Elhamias et al. ............. 710/117 |
| 2010/0064366 A1* | 3/2010 | Zhang ............................ 726/22 |
| 2010/0138430 A1 | 6/2010 | Gotou |

OTHER PUBLICATIONS

UPnP; "UPnP Security Ceremonies Design Document" UPnP Device Architecture 1.0; Oct. 3, 2003; pp. 1-18; Version 1.0; UPnP Implementers Corporation.

UPnP; "Device Security and Security Console V 1.0" Nov. 15, 2003; pp. 1-2; Version 1.0; UPnP Implementers Corporation.

* cited by examiner

ACCESS CONTROL AT A MEDIA SERVER

CROSS-REFERENCE TO RELATED APPLICATION(S)

This application claims priority from U.S. App. No. 61/484,484 filed May 10, 2011, the contents of which are incorporated herein by reference.

FIELD

The specification relates generally to a media server, and specifically to a method, system and apparatus for access control at a media server.

BACKGROUND

Development of mobile computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
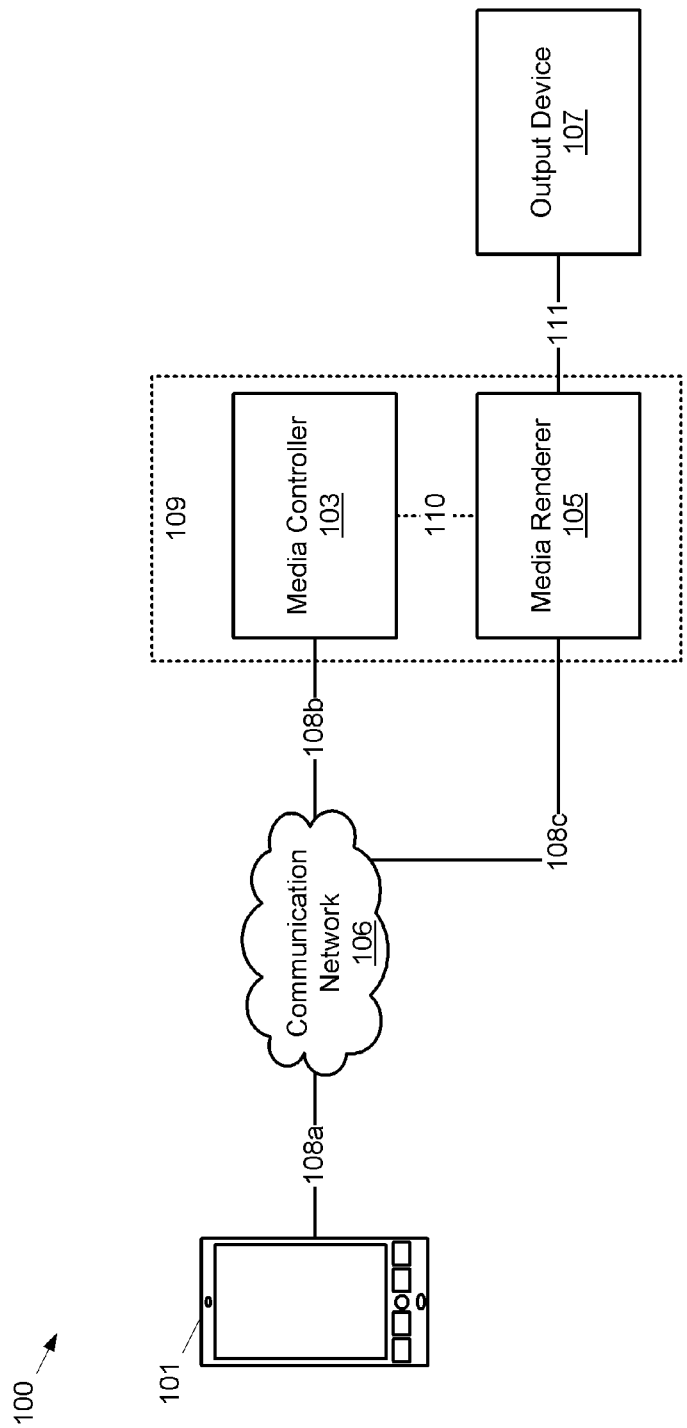
FIG. 1 depicts a system for controlling access to a media server, according to non-limiting implementations.

The present specification provides a computing device comprising: a memory module comprising a memory structure including content files; a communication interface for communicating with a remote computing device; and, a processor enabled to: receive, via the communication interface, a browse request from the remote computing device; initiate authentication of the remote computing device; and prior to the remote computing device being authenticated, transmit, via the communication interface, a response to the remote computing device indicative that the memory structure is empty of the content files, regardless of actual content of the memory structure.

The processor can be further enabled to, after the remote computing device is authenticated, transmit, via the communication interface, a further response to the remote computing device indicative of the actual content of the memory structure. The processor can be further enabled to: transmit, via the communication interface to the remote computing device, an indication that the memory structure has changed in response to the remote computing device being authenticated; receive, via the communication interface, a further browse request from the remote computing device in response to the transmit of the indication, wherein the further response is transmitted in response to receiving the further request. The indication can comprise at least one of a system update ID and a container update ID. The processor can be further enabled to transmit, via the communication interface, a refresh command to the remote computing device to trigger the remote computing device to refresh an associated remote display such that the associated remote display replaces an empty memory structure list with a populated memory structure list.

The response can be transmitted within a given time period. The given time period can be less than a timeout period of the remote computing device.

The computing device can further comprise a display and an input device, and wherein the authentication comprises the processor rendering an authentication interface at the display and receiving authentication data from the input device.

The processor can be further enabled to one or more of: store an identifier of the remote computing device on a white list at the memory module when the remote computing device is one or more of authenticated and pre-authenticated; and store an identifier of the remote computing device on a black list at the memory module when the authentication of the remote computing device is denied.

The present specification further provides a method comprising: receiving, at a computing device, a browse request from a remote computing device to browse a memory structure including content files; initiating authentication of the remote computing device; and prior to the remote computing device being authenticated, transmitting a response to the remote computing device indicative that the memory structure is empty of the content files, regardless of actual content of the memory structure.

The method can further comprise, after the remote computing device is authenticated, transmitting a further response to the remote computing device indicative of the actual content of the memory structure.

The method can further comprise: transmitting on a network comprising the remote computing device, an indication that the memory structure has changed in response to the remote computing device being authenticated; receiving a further browse request from the remote computing device in response to the transmitting of the indication, wherein the further response is transmitted in response to receiving the further request. The indication can comprise at least one of a system update ID and a container update ID. The method can further comprise transmitting a refresh command to the remote computing device to trigger the remote computing device to refresh an associated remote display such that the associated remote display replaces an empty memory structure list with a populated memory structure list.

The response can be transmitted within a given time period. The given time period can be less than a timeout period of the remote computing device.

The method can further comprise: rendering an authentication interface at a display associated with the computing device; and receiving authentication data from an input device associated with the computing device.

The method can further comprise one or more of: storing an identifier of the remote computing device on a white list at the memory module when the remote computing device is one or more of authenticated and pre-authenticated; and, storing an identifier of the remote computing device on a black list at the memory module when the authentication of the remote computing device is denied.

The present specification further provides a computer program product, comprising a computer usable medium having a computer readable program code adapted to be executed to implement a method comprising: receiving, at a computing device, a browse request from a remote computing device to browse a memory structure including content files; initiating authentication of the remote computing device; and prior to the remote computing device being authenticated, transmitting a response to the remote computing device indicative that the memory structure is empty of the content files, regardless of actual content of the memory structure. The computer program product can comprise a non-transitory computer program product.

FIG. 1 depicts a system 100 for controlling access to a media server 101, according to non-limiting implementations, and specifically system 100 is enabled to control access to media server 101 by one or more of a media controller 103 and a media renderer 150 via a communication network 106. In general, media server 101, also referred to hereafter as server 101, stores content, such as multimedia content, that can be rendered at an output device 107 in communication with media renderer 105. Media controller 103, also referred to hereafter as controller 103, communicates with server 101 and controls media renderer 105 to obtain content from server 101 and render the content at output device 107. Media renderer 105 will also referred to hereafter as renderer 105. Each of server 101, controller 103 and renderer 105 are in communication with communication network 106 via respective links 108a, 108b, and 108c, referred to collectively as links 108 and generically as a link 108. This convention will be used elsewhere, hereafter. Communication network 106 will also be referred to hereafter as network 106.

In some alternative implementations, controller 103 and renderer 105 are combined in a single controller/renderer 109; it is appreciated that, in these implementations, links 108b and 108c are also combined into a single link. Further, controller 103 and renderer 105 can be in communication via network 106 and links 108b, 108c. Renderer 105 is further in communication with output device 107 via a link 111. In other implementations, renderer 105 and output device 107 can be combined in a single device. In yet further implementations, controller 103, renderer 105 and output device 107 can be combined in any suitable combination in any suitable number of devices.

Figure 2:
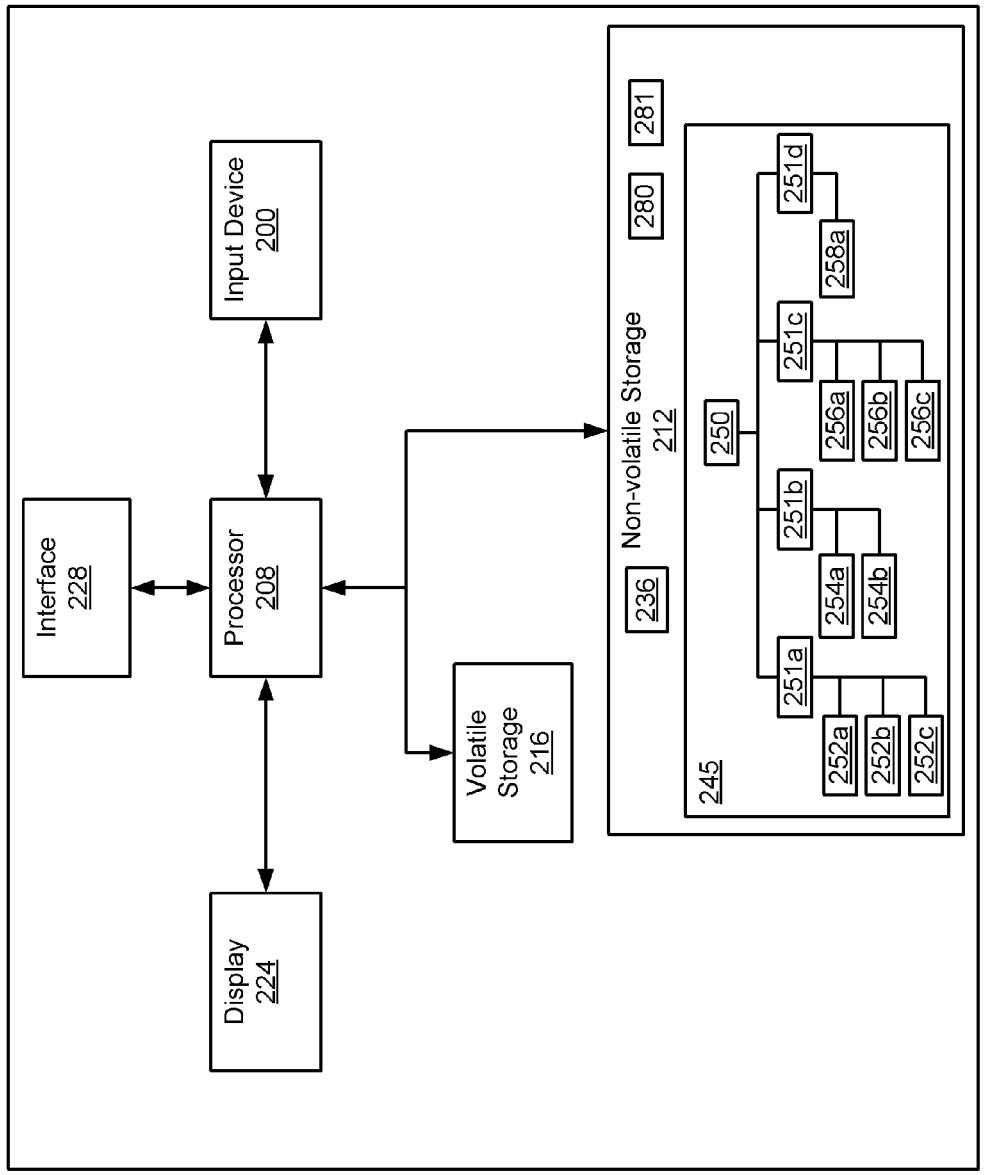
FIG. 2 depicts a schematic block diagram of a media server including a memory structure storing content files, according to non-limiting implementations.

Referring briefly now to FIG. 2, server 101 can be any type of electronic device enabled to interact with controller 103 and renderer 105 via links 108. Interaction includes transfer of data to renderer 105, including, but not limited to, content and lists of content as will presently be explained. It should be emphasized that the structure in FIG. 2 is purely exemplary.

Server 101 includes at least one input device 200. Input device 200 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage unit 216 during the execution of such programming instructions. Those skilled in the art will now recognize that non-volatile storage unit 212 and volatile storage unit 216 are examples of non-transitory computer readable media that can store programming instructions executable on processor 208. It is further appreciated that each of non-volatile storage unit 212 and volatile storage unit 216 are also examples of memory units and/or memory modules.

In particular, non-volatile storage unit 212 can store an application 236 for controlling access to server 101, such as an application for controlling access to server 101 by a remote computing device such as controller 103 and renderer 105, which can be processed by processor 208.

Further non-volatile storage unit 212 stores a memory structure 245. Memory structure 245 can be in any suitable format, including but not limited to a single folder, a tree structure, nested folders, and the like. In depicted example implementations, memory structure 245 comprises a root folder 250, with four subfolders 251, each subfolder storing any suitable number of respective content files 252, 254, 256,

258. It is appreciated that the number of subfolders 251 is not to be considered particularly limiting. Further, the number of respective content files 252, 254, 256, 258, in each subfolder 251 is also not to be considered particularly limiting. In some implementations, each respective subfolder 251 can be associated with a different type of content; for example, subfolder 251a can store music, subfolder 251b can store pictures, subfolder 251c can store voice notes and subfolder 251d can store videos. In other words, content files 252 can comprise music files such as MP3 files or the like, content files 254 can comprise picture files such as JPEG files or the like, content files 256 can comprise audio files such as MP3 files or the like, and content files 258 can comprise video files such as AVI files or the like. It is further appreciated that further subfolders 251 can store other types of content, including but not limited to podcasts, DVD files, multimedia files, flash content, references (e.g. links) to live streaming content and any other suitable type of content. It is yet further appreciated that the number of subfolders 251 and the type of content stored therein can be customized as desired and is not to be considered particularly limiting.

It is yet further appreciated that each subfolder 251 can further comprise additional subfolders to arrange content stored therein. For example, when subfolder 251a stores music, and hence content files 252 comprise music files, subfolder 251a can comprise additional subfolders arranging content files 252 by genre, artist, album, and the like. Indeed, it is yet further appreciated that any suitable number of additional subfolders is within the scope of present implementations, and that in turn each additional subfolder can comprise yet further subfolders to yet further arrange content files (e.g. via first subfolder storing content by a given artist, the first subfolder storing second subfolders corresponding to albums by the given artist, each album subfolder storing content files 252 associate with each respective album).

Those skilled in the art will now recognize that the arrangement and content of memory structure 245 is generally non-limiting and can comprise any suitable memory structure.

In some implementations, non-volatile storage unit 212 can further be enabled to store a white list 280 and a black list 281. White list 280 stores identifiers of devices which have already been authenticated at server 101, and black list 281 stores identifiers of devices which have been denied authentication by server 101 and which should continue to be denied access. It is appreciated that pre-authentication is within the scope of present implementations in that pre-determined characteristics and/or identifiers (name/friendlyName, wildcard) of allowed devices can be defined and stored on white list 280. Similarly, it is appreciated that pre-defined denial is within the scope of present implementations in that pre-determined characteristics of denied devices (name/friendlyName, wildcard) can be defined and stored on black list 281. Furthermore, one or more of predefined authentication and pre-defined denial can be based on a given pattern (device name/friendlyname, wildcard, and the like).

In some implementations, white list 280 and black list 281 can be session based (i.e. the time between server 101 becomes operable/turned on to when server 101 is turned off/restarted). For example, when a device, such as controller 103, is identified by an IP address, then the device associated with the IP address can be identified each time server 101 becomes operable (i.e. a new session is started) and the device associated with the IP address attempts to connect to server 101 and/or browse server 101. For example, when server 101 is restarted, prompts to authenticate devices which had previously been authenticated will be provided again (as described below with reference to FIGS. 17 and 18); such a mode prevents new devices having the same IP address as a previous authenticated device from being automatically authenticated when they may be malicious devices. In other words, IP addresses can change or be spoofed and are not unique and therefore associated devices can be authenticated every time server 101 becomes operable and the associated device attempts to connect to server 101 and/or browse server 101. However, when devices can be identified by a UUID (universally unique identifier), it can be safe to persist the authentication of that device 103 from session to session since the device identifier is unique from session to session (unlike an IP address which can change from session to session), and re-authentication can be redundant. It is appreciated that white list 280 and black list 281 can hence be updated at the beginning of each session based on whether stored identifiers are IP addresses or unique identifiers, with IP addresses being deleted from each of white list 280 and black list 281.

Returning to processor 208, processor can also be configured to render data at a display. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like).

In some implementations, input device 200 and display 224 are external to server 101, with processor 208 in communication with each of input device 200 and display 224 via a suitable connection and/or link.

Processor 208 also connects to a network interface 228, which can be implemented in some implementations as radios configured to communicate over links 108a, 108b. In general, it will be understood that interface 228 is configured to correspond with the network architecture that is used to implement link 108a. (In other implementations a plurality of links 108 with different protocols can be employed by server 101 and thus a plurality of interfaces can be provided to support each link.) It should be understood that in general a wide variety of configurations for server 101 are contemplated.

In some implementations, server 101 comprises any suitable computing device enabled to operate as a media server and for processing application 236, including but not limited to any suitable combination of personal computer, portable electronic devices, mobile computing device, portable computing devices, tablet computing devices, laptop computing devices, PDAs (personal digital assistants), cellphones, smartphones and the like. Other suitable computing devices are within the scope of present implementations.

Returning to FIG. 1, controller 103 can comprise any suitable media controller and while not depicted it is appreciated that controller 103 comprises a processor, a memory and a network interface similar to processor 208, volatile storage unit 216 (and/or non-volatile storage unit 212), and interface 228 described above. It is appreciated, however that controller 103 is further enabled for communication with renderer 105. For example, controller 103 can be enabled to obtain an indication of memory structure 245 from server 101 (e.g. in the form a list of content files 252, 254, 256, and 258, arranged by subfolder 250), receive input indicative of a selection of one or more of content files 252, 254, 256, and 258, and control renderer 105 to obtain the selected one of content files 252, 254, 256, and 258 from server 101 and render the selected one of content files 252, 254, 256, and 258 at output device 107.

Renderer 105 can comprise any suitable media renderer and while not depicted it is appreciated that renderer 105 comprises a processor, a memory and a network interface similar to processor 208, volatile storage unit 216 (and/or non-volatile storage unit 212), and interface 228 described above. It is appreciated; however that renderer 105 is further enabled for communication with controller 103 and output device 107. In particular, under control of controller 103, renderer 105 is enabled to obtain the selected one of content files 252, 254, 256, and 258 from server 101 and render the selected one of content files 252, 254, 256, and 258 at output device 107.

Output device 107 can comprise any suitable output device, including but not limited to any suitable combination of a display (similar to display 224), a projector, at least one speaker, and the like.

Controller 103 can be further enabled to control renderer 105 to render a representation of the indication of memory structure 245 at output device 107, such that a given one of content files 252, 254, 256, and 258 can be selected. Hence, one or more of controller 103 and renderer 105 can further comprise at least one input device for receiving input data to browse memory structure 145 and/or select the given one of content files 252, 254, 256, and 258 for rendering, as will be described below.

Each link 108, 110, 111 can comprise any suitable combination of wired and/or wireless links as desired including but not limited to cables, wired networks, wireless networks, the Internet, packet-based networks, analog networks, the PSTN (public switched telephone network), one or LANs (local area networks), one or more wLANs (wireless LANs), one or more WANs (wide area networks), WiFi networks, WiMax networks, or the like. Correspondingly network 106 can comprise any suitable combination of wired and/or wireless networks, the Internet, packet-based networks, analog networks, the PSTN, LANs, wLANs, WANs, WiFi networks, WiMax networks, or the like.

In particular non-limiting implementations, network 106 can comprise a LAN and/or wLAN in a business and/or a residence. It is appreciated that, in these implementations, control of access to server 101 can become particularly advantageous to prevent malicious computing devices that could gain access to network 106 from accessing content at server 101, for example content that could be sensitive, such as personal content, and/or that includes trade secrets or the like.

It is yet further appreciated that elements of system 100 can communicate using any suitable protocol, including but not limited to UPnP (Universal Plug and Play), DLNA (Digital Living Network Alliance), and the like. UPnP generally comprises a standard that enables devices to be plugged into a network and automatically know about each other, to connect seamlessly and to simplify the implementation of networks in the home (data sharing, communications, and entertainment) and in corporate environments. DLNA generally comprises a standard used by manufacturers of consumer electronics to allow entertainment devices within, for example, the home to share their content with each other across a home network. According to UPnP and DLNA specifications, any UPnP/DLNA client on a network should be able to access a media server, such as server 101, without any security restrictions. This may not be preferred, for example, if the media server functionality is running on a handheld device that may be portable. Hence, as will presently be described, by controlling access to server 101, for example on a handheld device, via an application on the handheld device such as application 236, access control checking can be added to server 101. This way, only UPnP/DLNA clients who are authenticated will be able to access the content at server 101, without making changes to the UPnP/DLNA clients themselves.

Figure 3:
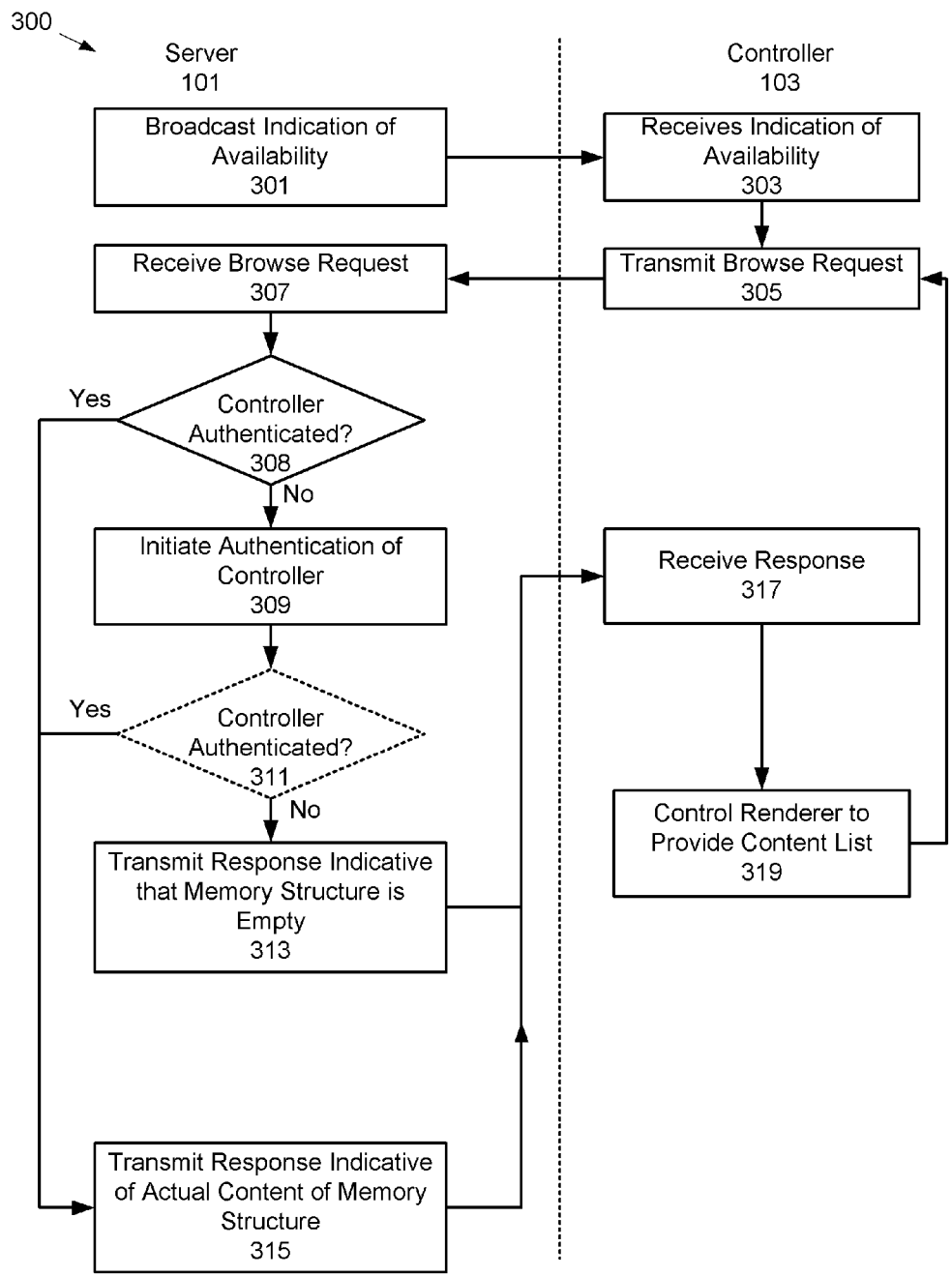
FIG. 3 depicts a block diagram of a method for controlling access to a media server, according to non-limiting implementations.

Attention is now directed to FIG. 3 which depicts a method 300 for controlling access to a media server. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that method 300 is implemented in system 100 by processor 208 of server 101, processing application 236, and by the processor at controller 103. It is further appreciated that method 300 will be described with reference to FIGS. 5 to 7, each of which are similar to FIG. 1, with like elements having like numbers. It is yet further appreciated that in the following description communications to and from network 106 and links 108 occur via suitable network interfaces, such as network interface 228.

Figure 4:
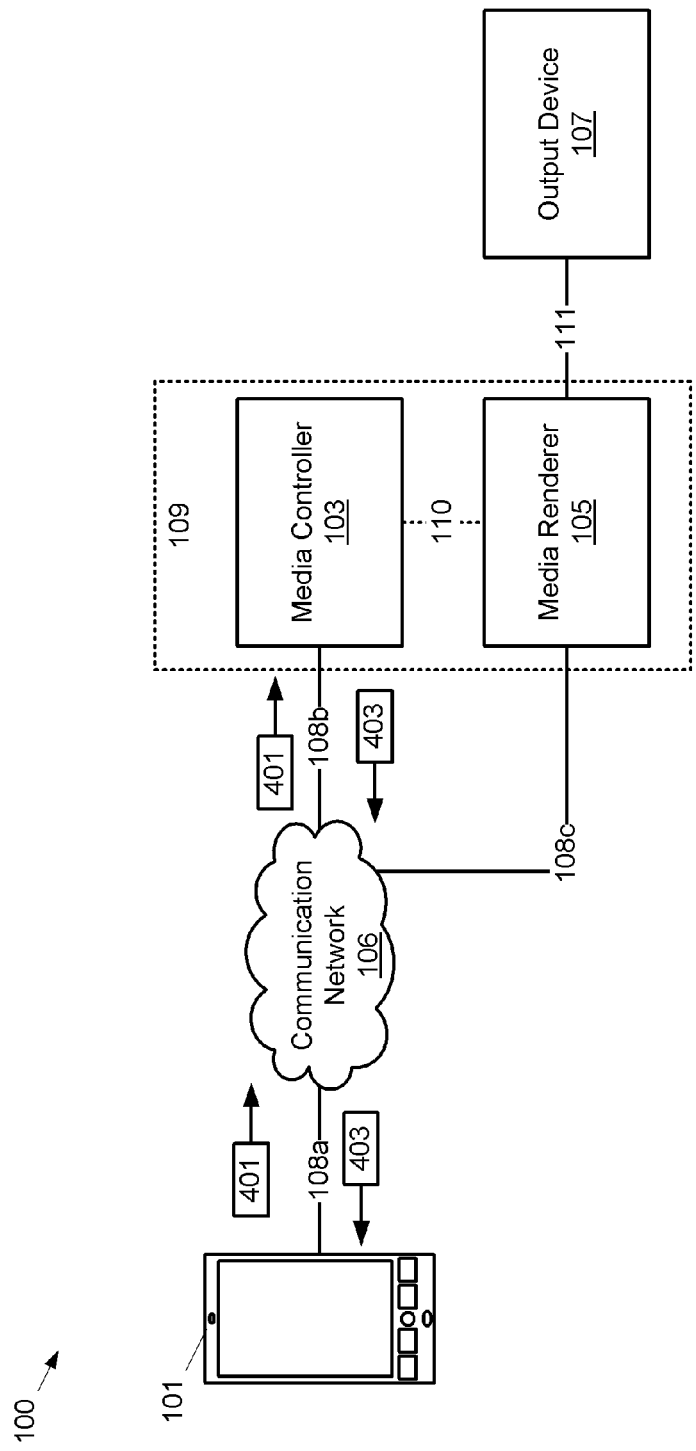
FIGS. 4 to 6 depict communications between elements of the system of FIG. 1, according to non-limiting implementations.

At block 301, and with reference to FIG. 4, server 101 broadcasts an indication 401 of availability on network 106. For example, indication 401 can comprise an identifier of server 101 (including but not limited to an IP (internet protocol) address, a natural name, or the like, as well as data identifying server 101 as a media server). In some implementations, indication 401 can comprise a system identifier (ID) and/or a container ID indicative of a present state of server 101. At block 303, indication 401 is received at controller 103. At block 305, in response to receiving indication 401, controller 103 transmits a browse request 403 to server 101. In some implementations, browse request 403 can be further dependent on receipt of input data at controller 103 to browse server 101, the input data initiated upon actuation (e.g. by a user) of a suitable input device associated with controller 103 (i.e. browse request 403 can be initiated via intervention of a user). Browse request 403 generally comprises a request for an indication of content stored at server 101; browse request 403 further generally comprises an identifier of controller 103 (including but not limited to an IP address, a natural name, or the like).

Figure 6:
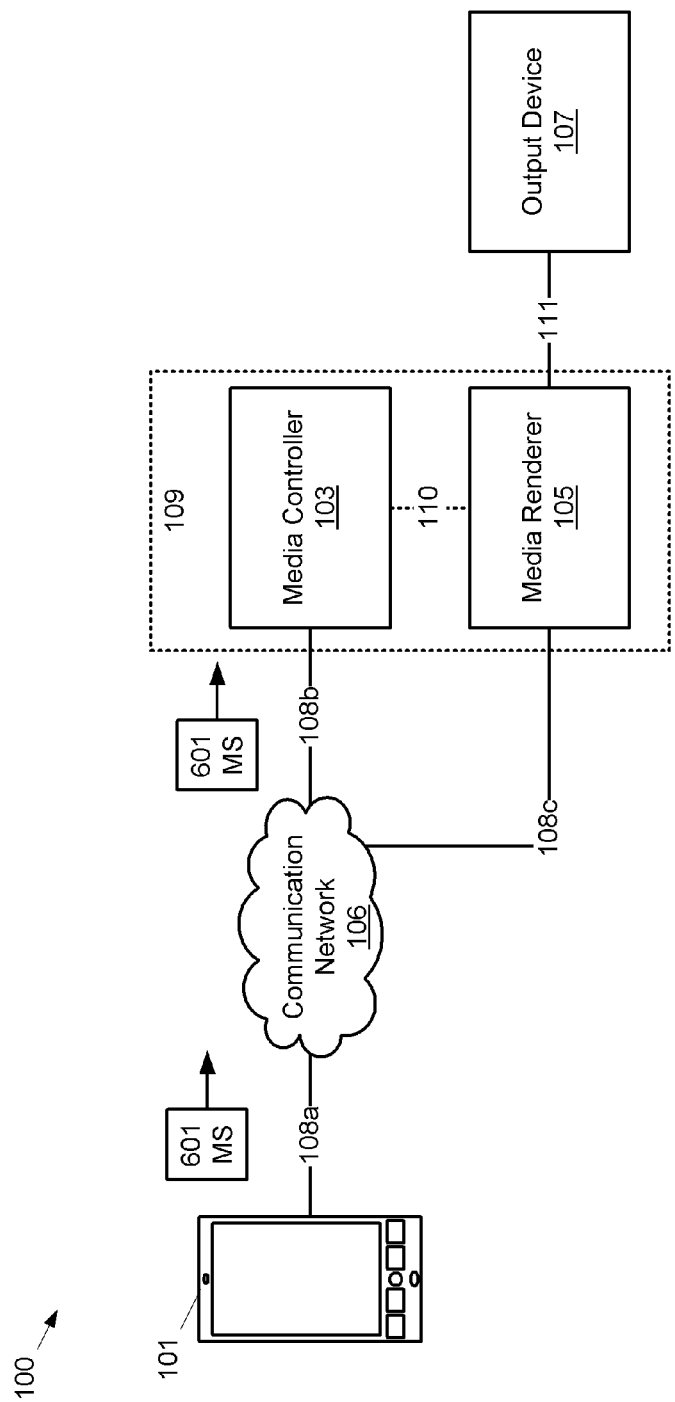

At block 308, a check is made as to whether or not controller 103 is already authenticated, for example by checking whether the identifier received with browse request 403 is stored, for example, on a white list 280 at non-volatile storage unit 212. If so, then block 315, described below with reference to FIG. 6, is then executed to transmit a response 601 indicative of the actual content of memory structure 315.

However when controller 103 has not been previously authenticated, at block 309, authentication of controller 103 is initiated at server 101. Any suitable process for authentication is within the scope of present implementations. For example, in some implementations, as will be described below, a GUI (graphic user interface) is rendered at display 224, providing an identifier of controller 103 as received with browse request 403, and selectable options to allow or deny access of controller 103 to content on server 101. Depending on the option selected, controller 103 is allowed or denied access to server 101. Hence, in these implementations, authentication comprises processor 208 rendering an authentication interface at display 224 and receiving authentication data from input device 200.

It is appreciated that authentication of controller 103 can occur over a given period of time, and that if a response to browse request 403 is not transmitted within, for example, a timeout period, then controller 103 will categorize server 101 as being unresponsive. For example, in some implementations, controller 103 may not respond to further broadcasts of indications of availability by server 101.

Alternatively, if a response to browse request 403 is not received within the given period of time, controller 103 can be enabled to periodically transmit further browse requests, up to a maximum number of browse requests. If no response is received to any of the further browse requests, then controller 103 will categorize server 101 as being unresponsive. For example, in some implementations, controller 103 may not respond to further broadcasts of indications of availability by server 101.

In either case, however, the result is the same: communications between server 101 and controller 103 fail. In the case of UPnP and/or DLNA protocols being used in system 100, each protocol defines that if a response to a browse request (up to a maximum number) is not received, and then the UPnP/DLNA client categorizes the media server as unresponsive.

Thus, if server 101 waits until the authentication of controller 103 is complete before transmitting a response to browse request 403, either a timeout period and/or a maximum number of browse requests can be exceeded and communication between server 101 and controller 103 can be rendered inoperable. However, if server 101 transmits an indication of the content of server 101 (e.g. in a response) before authentication is complete, then content of server 101 could be transmitted to an unauthenticated remote computing device.

Figure 5:
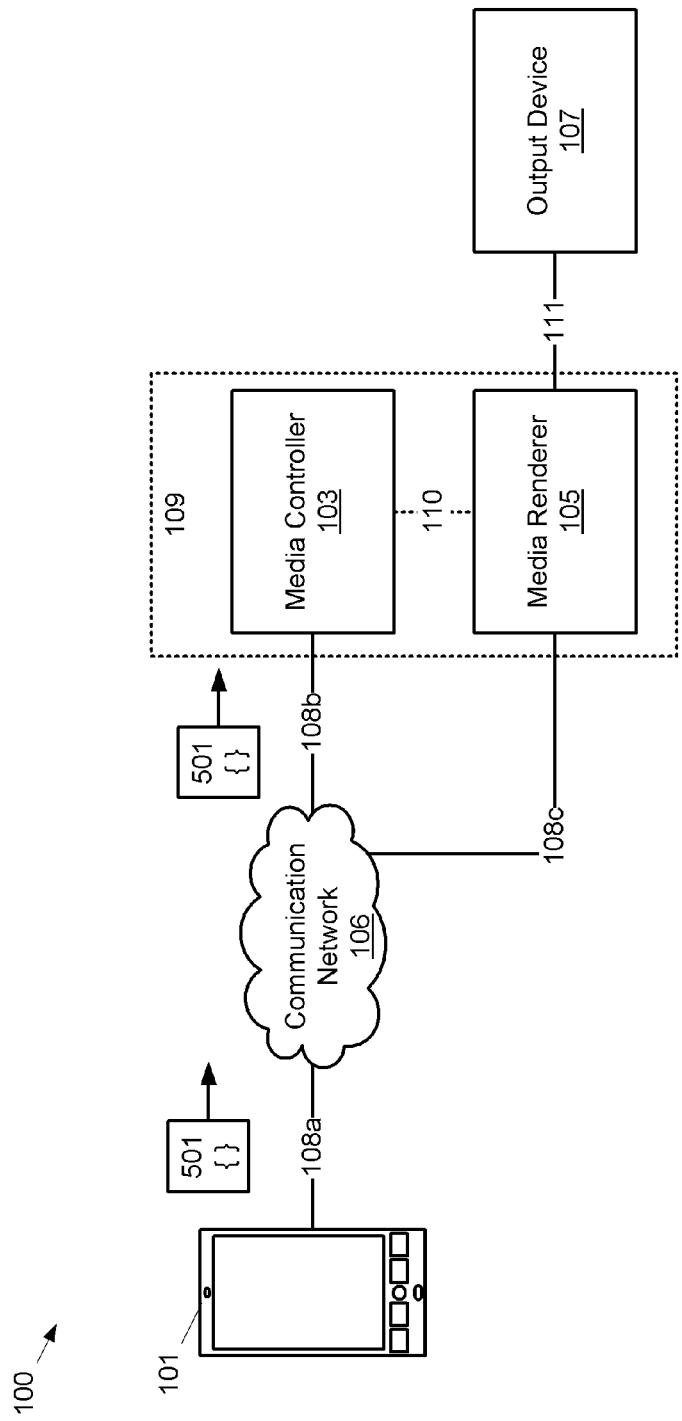

Hence, to address this problem, at block 313 and with further reference to FIG. 5, server 101 transmits a response 501 to controller 103 indicative that memory structure 245 is empty of content files 252, 254, 256, 258, regardless of actual content of the memory structure 245. Response 501 is received at controller 103 at block 317 and optionally, at block 319, controller 103 controls renderer 105 to provide, for example, a browseable list of content based on response 501. However as response 501 is indicative that memory structure 245 is empty of content files 252, 254, 256, 258, it appears to controller 103 as if there is no content stored on server 101 (i.e. until controller 103 has been authenticated, as presently described). In some implementation, controller 103 (and indeed any non-authenticated clients) will see an empty tree which includes default top level domains and/or top level domain folders, such as root folder 250 and subfolders 251, all will appear empty regardless of content files 252, 254, 256, 258 stored therein.

Response 501 can be transmitted: immediately when controller 103 has not been previously authenticated; and/or in parallel with initiation of authentication at block 309 (i.e. once it is determined that controller 103 is not authenticated at block 308); and/or response 501 can be transmitted within a given time period, for example a time period that is less than a timeout period of controller 103. Indeed, it is appreciated that response 501 is transmitted within any suitable time period less than a timeout period of controller 501.

In some alternative implementations, before response 501 is transmitted, a further determination can be made at block 311 as to whether or not the authentication is complete. In other words a check whether authentication of controller 103 is complete is performed at block 311. For example, block 311 can be implemented prior to the end of a given time period, such as the timeout period of controller 103. When controller is not yet authenticated then response 501 is transmitted at block 313. When controller 103 is authenticated, then block 315 is implemented as will presently be described.

It is further appreciated that response 501 can be transmitted regardless of whether controller 103 is identified by a UUID, a natural name, and an IP Address for authentication.

In any event, whether from a decision at block 308 or optional block 311, after controller 103 is authenticated, at block 315, and with further reference to FIG. 6, server 101 transmits a response 601 to controller 103 indicative of the actual content of the memory structure 245 (as indicated by "MS" in FIG. 6). Response 601 is received at controller 103 at block 317 and optionally, at block 319, controller 103 controls renderer 105 to provide (and in some implementations obtain), for example, a browseable list of content stored at server 101 based on response 601. However, in these implementations, as controller 103 is authenticated, controller 103 (and indeed any authenticated client) is provided with an indication of the actual content stored at server 101. Content can then be browsed and selected, and renderer 105 controlled to obtain a selected content file 252, 254, 256, 258 from server 101 and render the selected content file 252, 254, 256, 258 at output device 107.

It is appreciated that controller 103 is enabled to transmit browse requests to server 101, receive responses indicative of content of server 101, and control renderer to provide (and in some implementations obtain) a browseable list of content based on the responses from server 101. Hence, at block 319, the list based on the response received from server 101 will depend on whether the response received is response 501 (e.g. an empty tree structure) or response 601 (e.g. a populated tree structure). When response 501 is received (i.e. controller 103 is not authenticated), browsing of the list will indicate that all categories of subfolders 250 (e.g. music, video etc.) are empty regardless of the actual content stored therein. When response 601 is received (i.e. controller 103 is authenticated), browsing of the list will show the actual content of each subfolder 250 (e.g. music, video etc.).

It is appreciated that blocks 305 through 319 can be repeated as further browse requests are transmitted as content is browsed at controller 103. However, it is further appreciated that once authentication is completed, block 315 will be executed rather than blocks 309 to 313.

Figure 7:
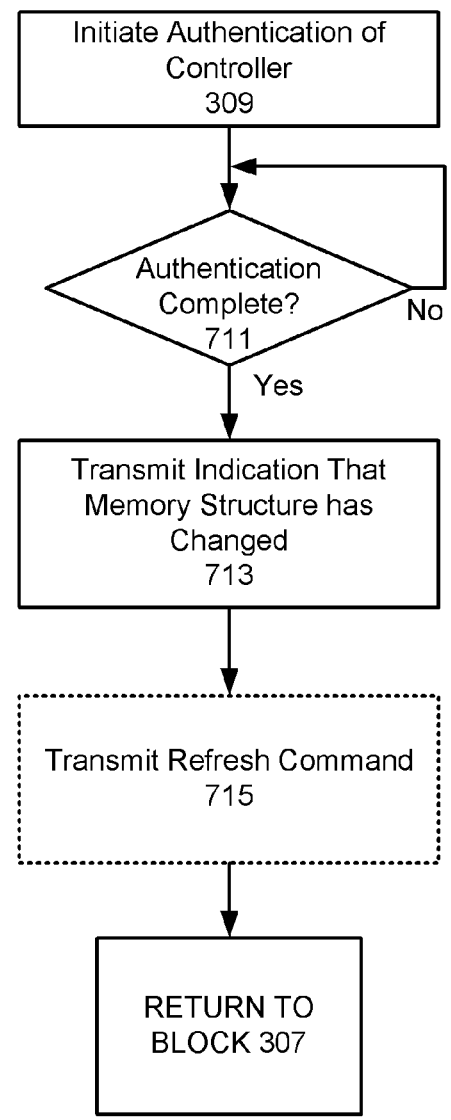
FIG. 7 depicts a block diagram of a method for indicating that authentication has been granted, according to non-limiting implementations.

To further clarify methods which occur at server 101, attention is next directed to FIG. 7, which depicts a method 700 for indicating that authentication has been granted. In order to assist in the explanation of method 700, it will be assumed that method 700 is performed using system 100. Furthermore, the following discussion of method 700 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that method 700 is implemented in system 100 by processor 208 of server 101, processing application 236. It is further appreciated that method 700 commences with block 309 of method 300. In other words, method 700 assumes that browse request 403 has been received such that initiation of authentication occurs at block 309. It is appreciated that method 700 can further occur in parallel with method 300, such that each of blocks 711 (described hereafter) and 311 occur after initiation of authentication at block 309.

Figure 8:
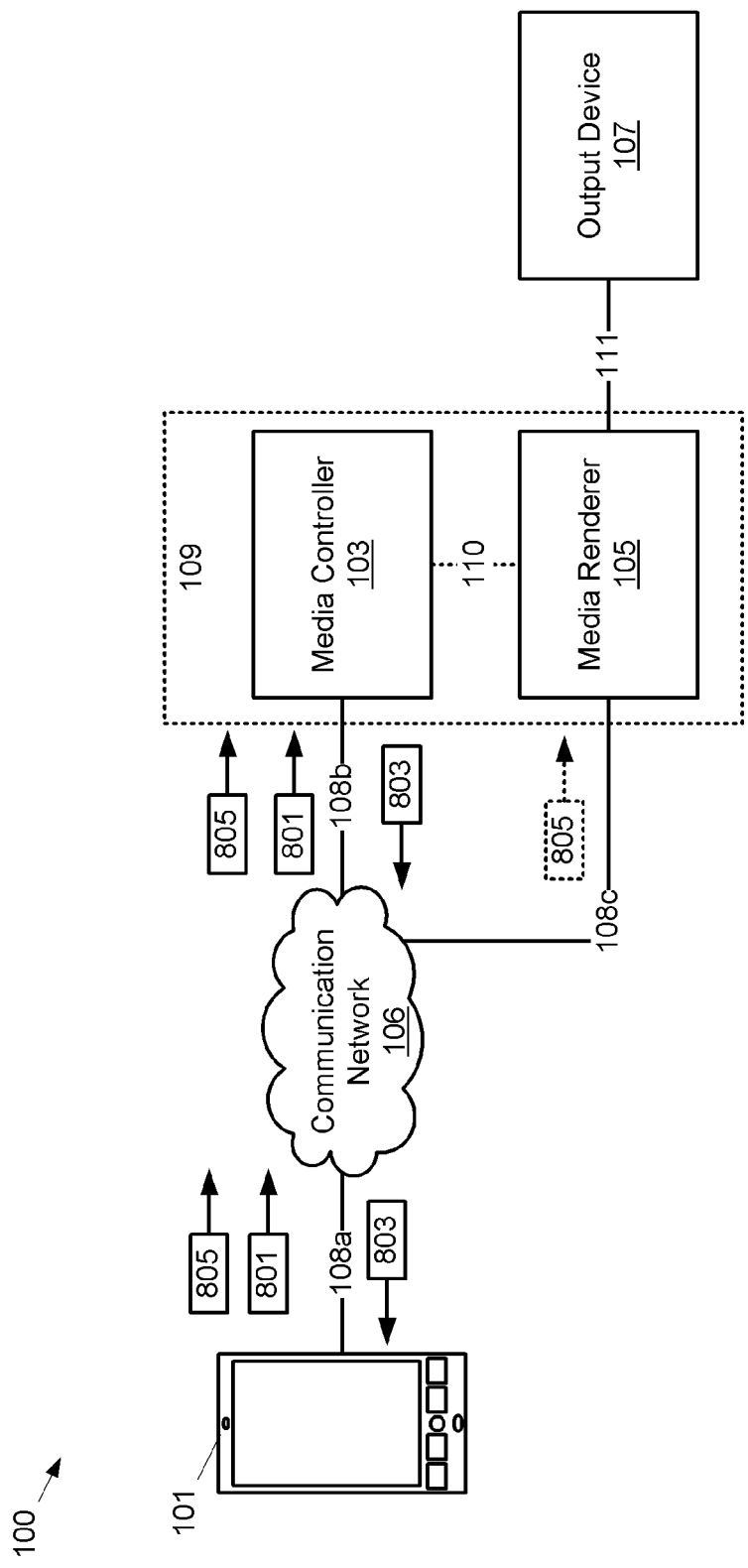
FIG. 8 depicts communications between elements of the system of FIG. 1, according to non-limiting implementations.

At block 711, a determination is made as to whether authentication is complete. Until authentication is complete, block 711 repeats. With reference to block 713 and FIG. 8, in response to controller 103 being authenticated, server 101 broadcasts an indication 801 that memory structure 245 has changed. Alternatively, server 101 can transmit indication

801 to controller 103. In some implementations, server 101 transmits indication 801 to controller 103 by broadcasting indication 801. In some implementations indication 801 can comprise an updated system ID and/or updated container ID, which are updated (e.g. incremented by 1) in response to authentication of controller 103. It is appreciated that memory structure 245 has not actually changed, but will appear to have changed to controller 103, which had previously received response 501 indicative that memory structure 245 is empty of content files 252, 254, 256, 258, regardless of actual content of the memory structure 245. In other words, server 101 is behaving with the context of UPnP/DLNA protocols in order to let controller 103 know that, when controller 103 again sends a browse request controller 103, will be advised that changes have occurred. Thus from the perspective of controller 103, it appears that memory structure 245 is initially empty, and then later populated with content files 252, 254, 256, 258.

For example, controller 103 receives indication 801 in the form of the updated system ID and/or updated container ID and compares (respectively) the updated with the system ID and/or the container ID received with indication 401 which was originally received from server 101. As they are different, controller 103 determines that a change has occurred at server 101 and transmits a further browse request 803 in response to receiving indication 801. Further browse request 803 is received at server 101, for example at block 307 of method 300.

In some implementations, at an optional block 715 server 101 transmits a refresh command 805 to controller 103 (and/or renderer 105) to trigger controller 103 (and/or renderer 105) to refresh an associated remote display, for example at output device 107, such that the associated remote display replaces an empty memory structure list with a populated memory structure list. In other words, server 101 can force a refresh of a rendering of a browseable list at output device 107 as some devices may not pay attention to update system IDs and/or update container IDs (i.e. they may not update the screen). While within UPnP/DLNA protocols such a refresh command 805 can be redundant, devices receiving refresh command 805 might not conform to UPnP/DLNA protocols. Hence, for example, server 101 can force an update of a video list at renderer 105 in the event that renderer 105 does not conform to UPnP/DLNA protocols.

It is appreciated, however, that in yet further implementations, at least one of indication 801 and refresh command 805 can be similar to response 601 indicative of the actual content of memory structure 315, such that controller 103 can update the browseable list without transmitting further browse request 803.

Returning to the authentication process, it is appreciated that when authentication of controller 103 occurs, an identifier of controller 103 can be stored on white list 280. Hence, in method 300, at block 308, the determination can be made as to whether or no controller 103 has been previously identified by comparing the identifier received with browse request 403 with white list 280. Optionally, when authentication of controller 103 is denied, the identifier of controller can be stored on black list 281. Hence, when method 300 and/or method 700 are implemented, server 101 can further compares the identifier received with browse request 403 to black list 281 and, when present, server either not respond to any browse request from controller 103 or always transmit a response similar to response 501 indicative that memory structure 245 is empty of content files 252, 254, 256, 258, regardless of actual content of memory structure 245.

It is appreciated that while access to server 101 has been described above with reference to controller 103, method 300 and 700 can be implemented with any suitable remote computing device attempting to gain access to server 101, including but not limited to renderer 105, any suitable UPnP enabled device, any suitable DLNA enabled device, and the like. Hence, server 101 is generally enabled to: receive a browse request from a remote computing device; initiate authentication of the remote computing device; and prior to the remote computing device being authenticated, transmit a response to the remote computing device indicative that the memory structure is empty of the content files, regardless of actual content of the memory structure.

Attention is next directed to FIGS. 9 through 23 which depicts series of GUIs (graphic user interfaces) that can be rendered at display 224 of server 101 to aid in access control of a remote computing device to server 101.

Figure 9:
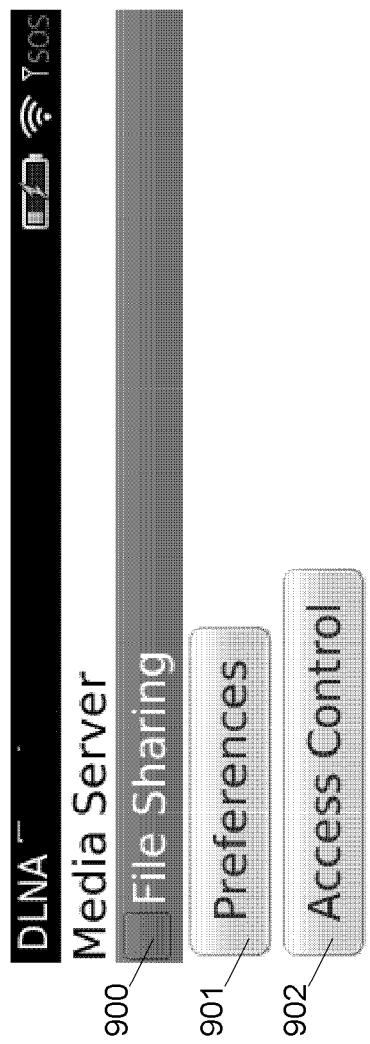
FIG. 9 depicts a graphic user interface (GUI) depicted at a display of the media server of FIG. 2, according to non-limiting implementations.

FIG. 9 depicts a GUI for controlling file sharing, including a selectable option 1500 for turning file sharing on and off. When file sharing is turned on (e.g. see FIG. 17), methods 300 and 700 are implemented. It is appreciated that activation of virtual buttons 901, 902 trigger rendering of respective GUIs for controlling Preferences, Access Control and Set SystemUpdateID, as will be presently be described. Furthermore, the current system ID is provided, as well as a list of available media servers, which is currently empty.

Figure 10:
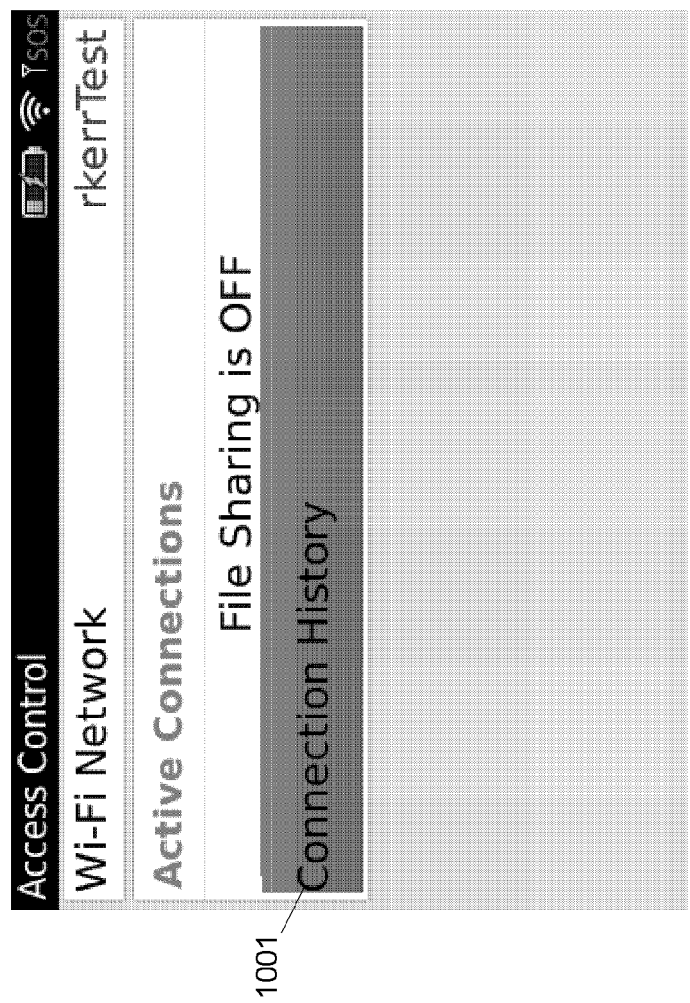
FIG. 10 depicts a graphic user interface (GUI) depicted at a display of the media server of FIG. 2, according to non-limiting implementations.
Figure 11:
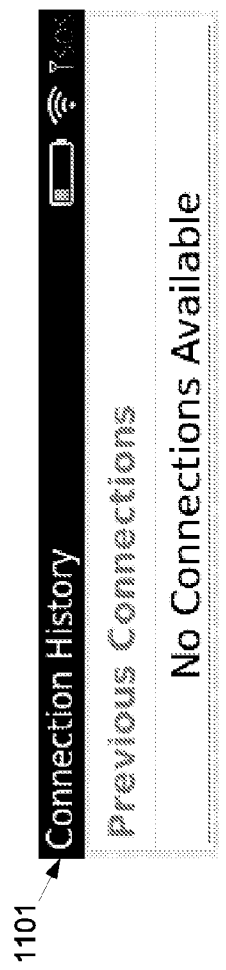
FIG. 11 depicts a graphic user interface (GUI) depicted at a display of the media server of FIG. 2, according to non-limiting implementations.

Upon selection of button 902, the GUI of FIG. 10 is rendered for managing connections. Optionally the GUI of FIG. 10 provides on indication of the current status of file sharing at server 101 (e.g. in this instance "OFF"), as well as an indication of the current network to which server 101 is connected (e.g. in this instance a WiFi network "rkerrTest" (i.e. network 106)). Also provided is a virtual button 1001, activation of which triggers rendering of a GUI 1101 providing "Connection History", a specific implementation of which is depicted in FIG. 11: in these implementations no previous connections were stored.

Figure 12:
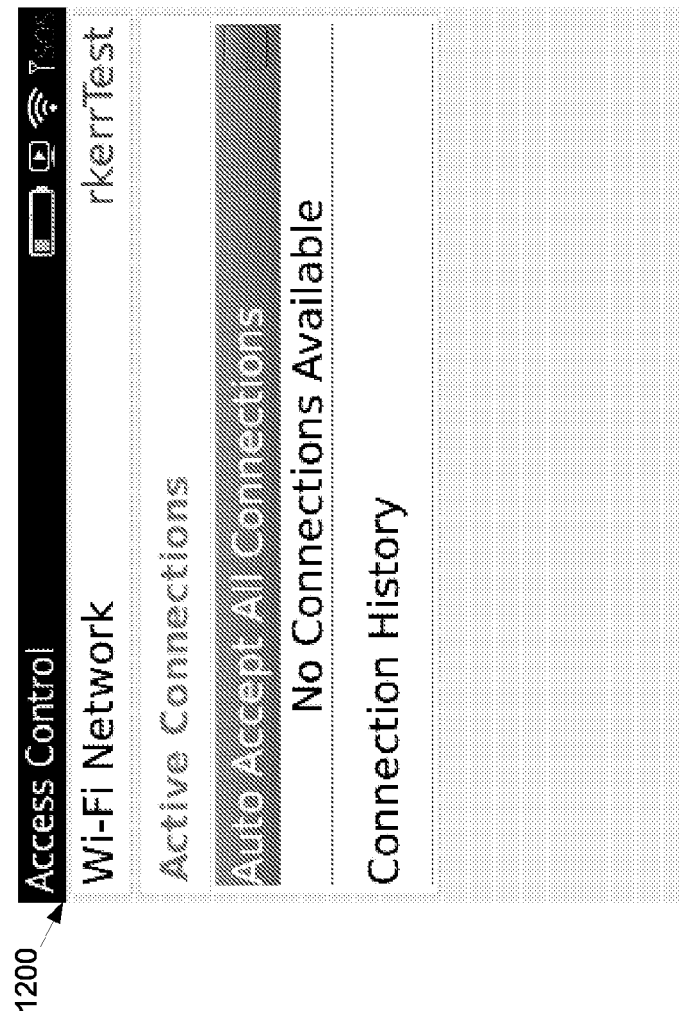
FIG. 12 depicts a graphic user interface (GUI) depicted at a display of the media server of FIG. 2, according to non-limiting implementations.

In alternative implementations, upon selection of button 902, the GUI of FIG. 12 can be provided when file sharing is turned ON (i.e. option 1500 is activated). The GUI 1200 of FIG. 12 provides an indication that an Auto Accept Connections (e.g. connections to other devices on network 106) option has been activated at server 101. In these implementations, any device on network 106 can connect with server 101 and permissions can be set for browsing, assuming that file sharing is enabled. However, no connections/devices have yet been detected.

Figure 13:
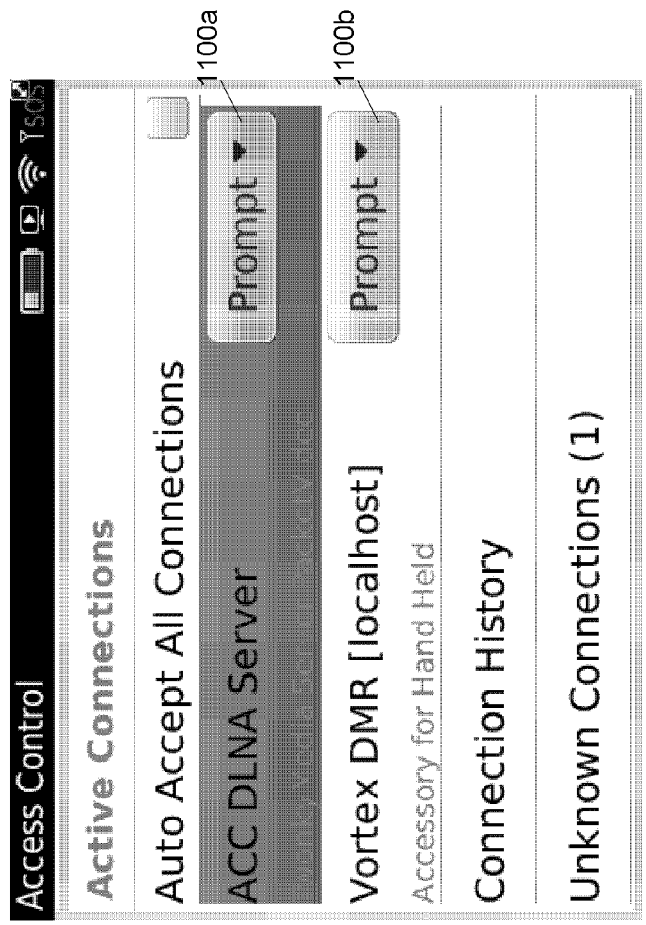
FIG. 13 depicts a graphic user interface (GUI) depicted at a display of the media server of FIG. 2, according to non-limiting implementations.

In contrast to this, in alternative implementations, upon selection of button 902, the GUI of FIG. 13 can be provided when file sharing is turned "ON" and devices have been detected on network 106 (e.g. via by receiving indications of availability broadcast by respective devices). In depicted implementations, various devices, for example controllers and renderers, have been detected on network 106, including "ACC DLNA Server" and "Vortex DMR [localhost]", each of which are natural name identifiers of devices on network 106, and each of which can be a controller, a renderer, another media server and any other suitable device. While the detected devices generally do not include other media servers, as media servers generally do not access other media servers, listing and authentication of detected media servers is not specifically excluded from present implementations. The GUI of FIG. 13 includes selectable options 1100 for each device, which will presently be described. It is appreciated that an "Auto Accept All Connections" option is not selected in FIG. 13 and hence permissions for any device attempting to connect to server 101 can be assigned. Further devices listed in the GUI of FIG. 13 can be identified by UUID's and hence whitelisted/blacklisted in a manner that persists from session to session (i.e. their identifiers persist in white list 280 or black list 281 from session to session).

Figure 14:
FIG. 14 depicts a graphic user interface (GUI) depicted at a display of the media server of FIG. 2, according to non-limiting implementations.

For example, FIG. 14 depicts a GUI similar to the GUI of FIG. 13; however, selectable option 1100a has been selected showing three options associated therewith to set permissions for an associated device: "Prompt", "Allows Allow" and "Never Allow". When "Never Allow" is selected connections with the associated device are always refused (e.g. an associated identifier is stored in a black list similar to black list 281). When "AlwaysAllow" is selected" connections with the associated device are always allowed (e.g. an identifier of an associated device is stored in a white list similar to white list 280). When "Prompt" is selected, a prompt can be provided each time a connection is attempted by an associated device. In general, it is appreciated that devices listed under "Active Connections" can have been previously detected and identifiers stored at server 101.

Figure 15:
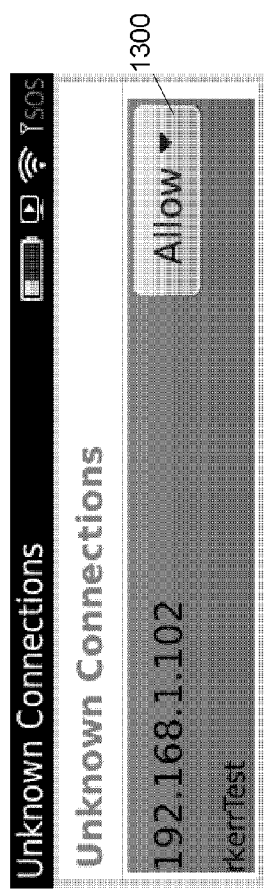
FIG. 15 depicts a graphic user interface (GUI) depicted at a display of the media server of FIG. 2, according to non-limiting implementations.

FIG. 15 depicts a GUI rendered when "Unknown Connections" is selected from the GUIs of FIG. 13 or 14. In these implementations, a list of devices which are identified by an IP address ("192.168.1.102") on network 106 are provided, along with a selectable option 1300. (In these implementations, devices identified by UUID's are not shown on the list of FIG. 15.) These devices are generally whitelisted/blacklisted for a current session (authentication settings applies until server 101 is restarted as described above, and their identifiers are removed/deleted from white list 280 or black list 281, at the end of each session, at the beginning of each session and/or when server 101 is restarted). However, in further implementations, an option can be provided to remove or maintain one or more of a previously defined white list and previously defined black list, as a default setting and/or as a selectable option (e.g. as described below with reference to FIG. 18).

Figure 16:
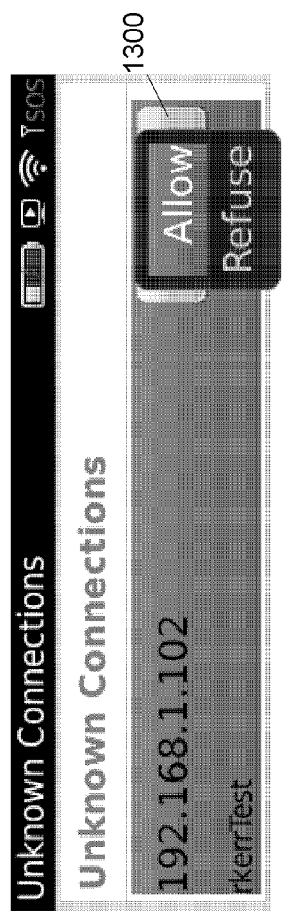
FIG. 16 depicts a graphic user interface (GUI) depicted at a display of the media server of FIG. 2, according to non-limiting implementations.

For example, FIG. 16 depicts a GUI similar to the GUI of FIG. 15; however, selectable option 1300 has been selected showing two options associated therewith to set connection permissions for the associated device: "Allow" and "Refuse". When "refuse" is selected the associated device is not allowed to connect with server 101. When "Allow" is selected, the associated device is allowed to connect with server 101. It is appreciated that selection of "Allow" does not automatically mean that the associated device can browse server 101, but that a further authentication process can be implemented when a browse request is received at server 101 from the associated device.

Figure 17:
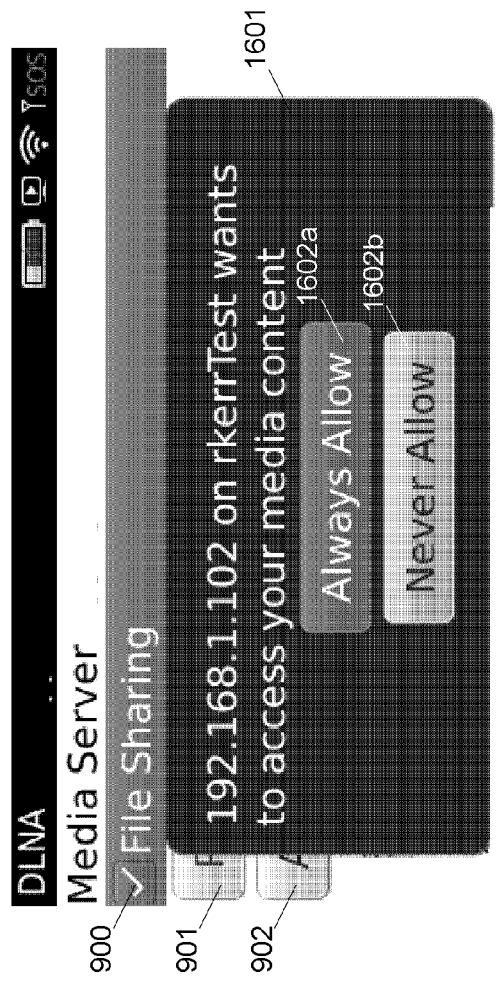
FIG. 17 depicts a graphic user interface (GUI) depicted at a display of the media server of FIG. 2, according to non-limiting implementations.

Attention is now directed to FIG. 17, which is similar to the GUI of FIG. 9; however, file sharing has been enabled by activation of selectable option 900. Hence when device identified by "192.168.1.102" transmits a browse request to server 101, as in blocks 305 and 307, pop-up 1601 is provided with selectable options 1602 to "Always Allow" or "Never Allow" access to server 101. When "Always Allow" is selected, the associated device identifier is placed on white list 280 and when "Never Allow" is selected, the associated device identifier is placed on black list 281. It is appreciated that until a selection is received, server 101 will respond to the browse request with a response similar to response 501 indicative that memory structure 245 is empty of content files 252, 254, 256, 258, regardless of actual content of memory structure 245.

Figure 18:
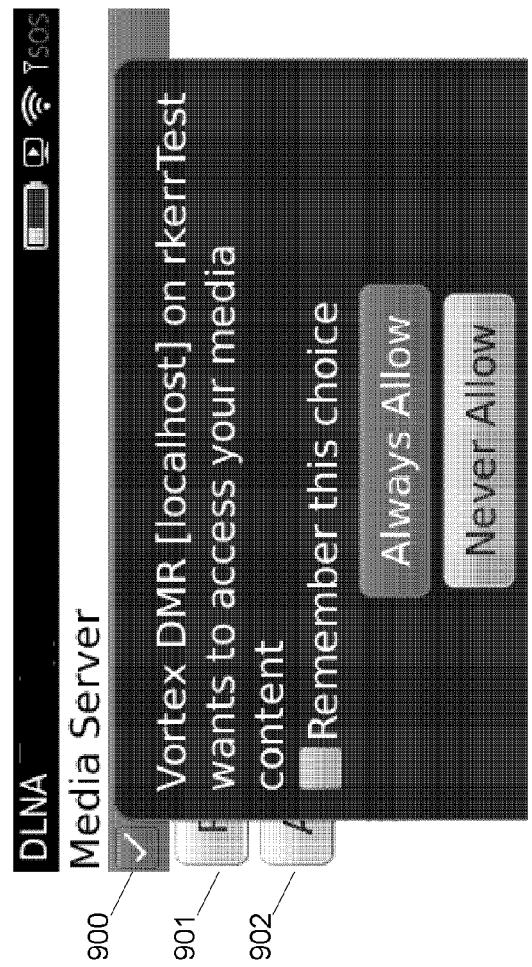
FIG. 18 depicts a graphic user interface (GUI) depicted at a display of the media server of FIG. 2, according to non-limiting implementations.

FIG. 18 depicts a GUI similar to the GUI of FIG. 17, however for device identified by "Vortex DMR [localhost]" has transmitted a browse request to server 101, as in blocks 305 and 307. Similar selectable options of "Always Allow" and "Never Allow" are provided. However an explicit option to "Remember this choice" using a checkbox is also provided as device identified by "Vortex DMR [localhost]" is further identified by a UUID. Hence, when "Remember this choice" is selected (e.g. the checkbox is checked) the associated UUID will persist on white list 280 or black list 281 from session to session, as described above. When "Remember this choice" is not selected (e.g. the checkbox is not checked) then the associated device will be authenticated every time server 101 is restarted and a further browse request is received in a new session, but not for every browse request in a current session. It is further appreciated that a similar option to "Remember this choice" is not provide in the GUI of FIG. 17 as the device is identified using an IP address. It is further appreciated that the "Remember this choice" selectable option and/or similar can be provided in combination with default settings to remove or maintain one or more of a previously defined white list and previously defined black list. In general, however, an option similar to "Remember this choice" can be provided at any suitable GUI, including GUIs for authenticating devices identified by IP addresses, as desired.

Figure 19:
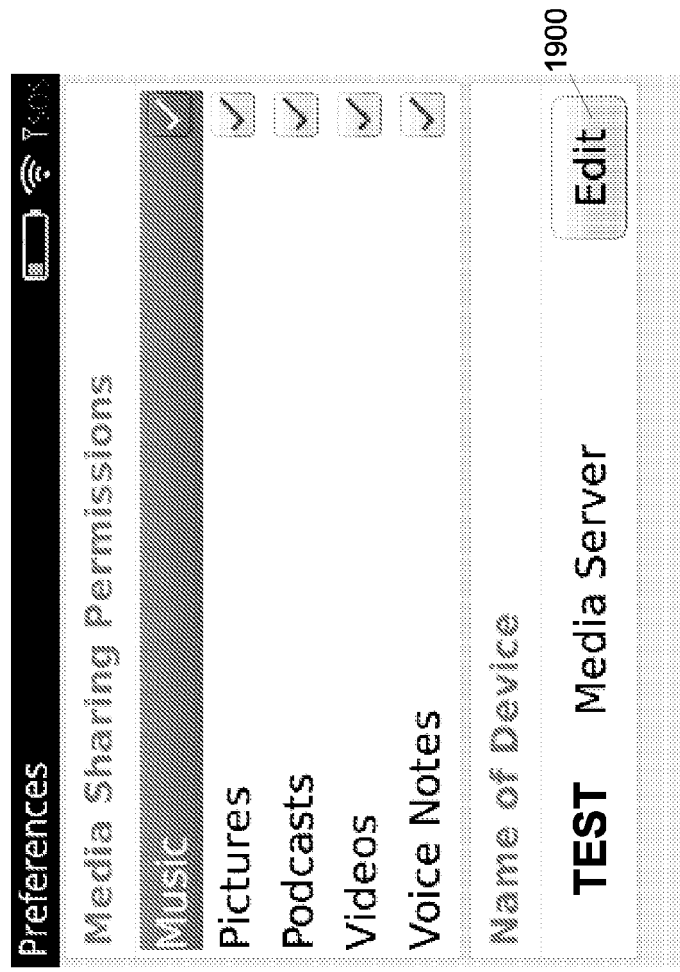
FIG. 19 depicts a graphic user interface (GUI) depicted at a display of the media server of FIG. 2, according to non-limiting implementations.

FIG. 19 depicts a GUI rendered when virtual button 901 is selected, providing selectable options to share given categories of content files and/or given subfolders 251, such as music, pictures, podcasts, videos, and/or voice notes. It is appreciated that when each of these options are selected or deselected, corresponding sections (e.g. subfolders 251) of memory structure 245 are shared or not shared. In some implementations, when a respective option is deselected, a response to a browse request indicates that a corresponding folder (e.g. subfolder 251) is empty regardless of the actual content of the corresponding folder.

It is yet further appreciated that in some implementations, granularity of access permissions can be further specific to particular content files 252, 254, 256, 258, instead of entire subfolders 251/categories or in combination with entire subfolders 251/categories. For example, one or more content files 252, 254, 256, 258 can be deselected (or selected as desired), indicating that the deselected one or more content files 252, 254, 256, 258 are not to be shared, even though the associated subfolder 251/category is selected for sharing. Hence, in these implementations, a response to a browse request omits an indication of the deselected one or more content files 252, 254, 256, 258 even though even though the associated folder 251/category is selected for sharing. In other words, in these implementations, the GUI of FIG. 17, can be expanded to provide, not only a category view, but a full tree view where individual content files 252, 254, 256, 258 can be selected and/or deselected for sharing.

Figure 20:
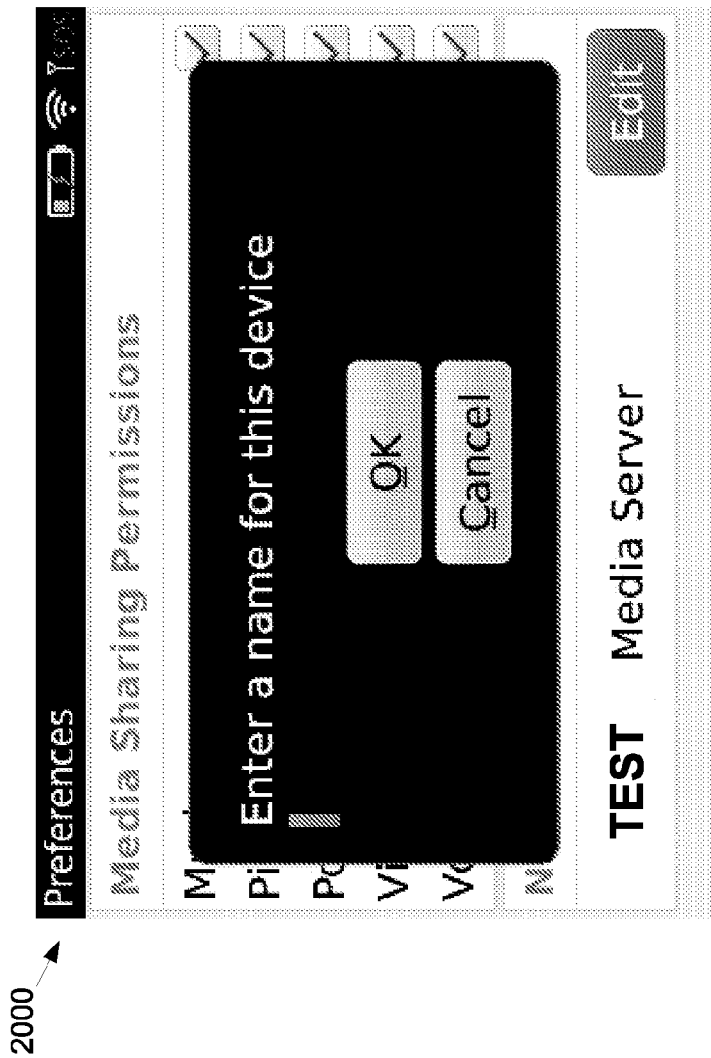
FIG. 20 depicts a graphic user interface (GUI) depicted at a display of the media server of FIG. 2, according to non-limiting implementations.

A natural name of server 101 can also be set from the GUI of FIG. 19 by selection of virtual button 1900, which triggers the GUI 2000 of FIG. 20, similar to the GUI of FIG. 19, enabling entry of a natural name for server 101 to identify server 101 on network 106. In depicted implementations server 101 is named "TEST Media Server".

Figure 21:
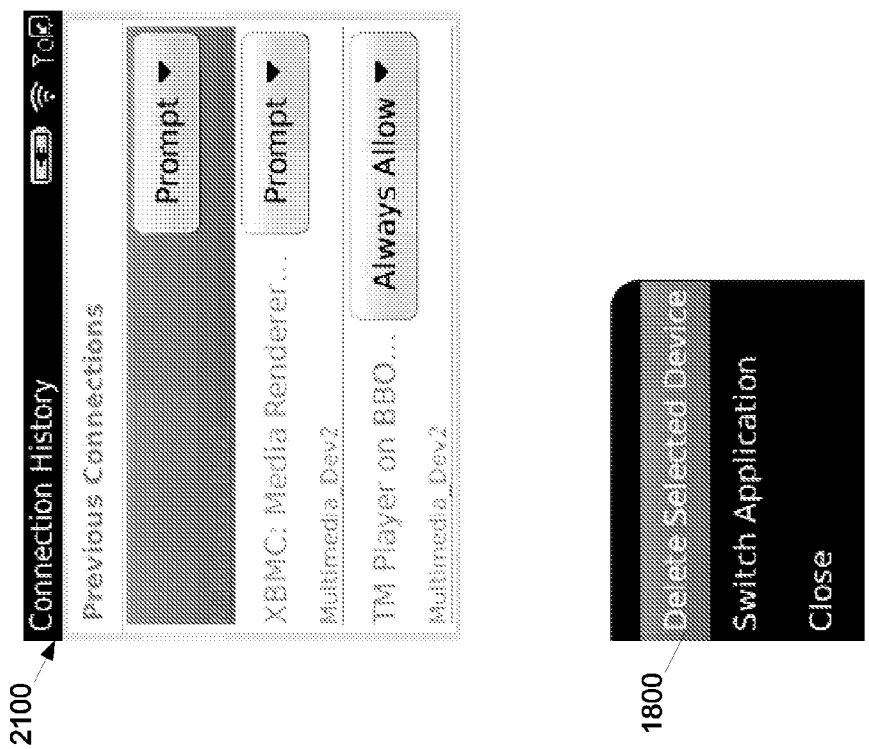
FIG. 21 depicts a graphic user interface (GUI) depicted at a display of the media server of FIG. 2, according to non-limiting implementations.

Attention is next directed to FIG. 21 which depicts a GUI 2100 similar to the GUI 1101 of FIG. 11, however in these implementations three connections have been previously made to three devices, and current permissions associated with each are indicated. It is appreciated that each respective permission can be changed via a respective selectable option, and/or a given device can be selected and deleted via a pop-up 1800 to "Delete Selected Device". Hence, for example, when a device is removed from a network, data associated with the device can be deleted from server 101, such as data on white list 280, data on black list 281, data stored in the lists of the GUI's of FIGS. 13-15 and FIGS. 21-22 (describe hereafter), or the like.

Figure 22:
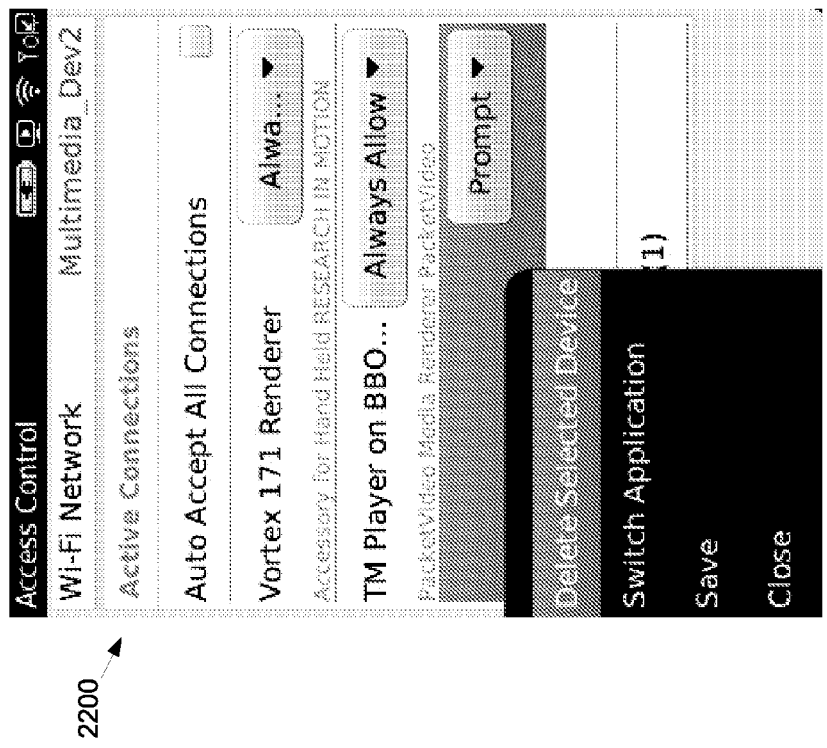
FIG. 22 depicts a graphic user interface (GUI) depicted at a display of the media server of FIG. 2, according to non-limiting implementations.

FIG. 22 depicts a GUI 2200 similar to the GUI 2100 of FIG. 21, however for a list of "Active Connections" rather than previous connections, again showing selection and deletion of a given device from the list.

In any event, a system for responding to browser requests from unauthenticated remote computing devices with a response indicative that a memory structure of the media server is empty of content files, regardless of actual content of the memory structure is provided. Such a system prevents timeouts from occurring between the media server and the requesting remote computing device thereby ensuring continuing communications there between. Further, no additional updates must be made to the remote computing device and/or protocols used to communicate between devices, such as UPnP protocols and DLNA protocols. Such a system further prevents unauthenticated remote computing devices from browsing the content of the media server.

Those skilled in the art will appreciate that in some implementations, the functionality of server 101, controller 103, and renderer 105 can be implemented using pre-programmed hardware or firmware elements (e.g., application specific integrated circuits (ASICs), electrically erasable programmable read-only memories (EEPROMs), etc.), or other related components. In other implementations, the functionality of server 101, controller 103, and renderer 105 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A computing device comprising:
a memory module comprising a memory structure including content files;
a communication interface for communicating with a remote computing device; and,
a processor enabled to:
receive, via the communication interface, a browse request from the remote computing device;
initiate an authentication process of the remote computing device to determine whether access of the remote computing device to the content files is to be granted or denied;
in parallel to initiating the authentication process, prior to the remote computing device being authenticated, transmit, via the communication interface, a response to the remote computing device indicative that the memory structure is empty of the content files, regardless of actual content of the memory structure, wherein the response is transmitted within a specified timeout period of the remote computing device;
grant access of the remote computing device to the content files;
in response to the remote computing device being granted access, transmit, via the communication interface, an indication that the memory structure has changed, wherein the indication comprises at least one of a system update ID and a container update ID;
in response to the transmission of the indication, receive, via the communication interface, a further browse request from the remote computing device; and
in response to receiving the further browse request, transmit, via the communication interface, a further response indicative of the actual content of the memory structure.

2. The computing device of claim 1, wherein the processor is further enabled to transmit, via the communication interface, a refresh command to the remote computing device to trigger the remote computing device to refresh an associated remote display such that the associated remote display replaces an empty memory structure list with a populated memory structure list.

3. The computing device of claim 1, further comprising a display and an input device, and wherein the authentication process comprises the processor rendering an authentication interface at the display and receiving data to allow or deny access of the remote computing device, the data received from the input device.

4. The computing device of claim 1, wherein the processor is further enabled to one or more of:
store an identifier of the remote computing device on a white list at the memory module when the remote computing device is one or more of granted access in the authentication process and granted access in a previous authentication process; and
store an identifier of the remote computing device on a black list at the memory module when the remote computing device is denied access.

5. A method comprising:
receiving, at a computing device, a browse request from a remote computing device to browse a memory structure including content files;
initiating an authentication process of the remote computing device to determine whether access of the remote computing device to the content files is to be granted or denied;
in parallel to initiating the authentication process, prior to the remote computing device being authenticated, transmitting a response to the remote computing device indicative that the memory structure is empty of the content files, regardless of actual content of the memory structure, wherein the response is transmitted within a specified timeout period of the remote computing device;

granting access of the remote computing device to the content files;

in response to the remote computing device being granted access, transmitting, via the communication interface, an indication that the memory structure has changed, wherein the indication comprises at least one of a system update ID and a container update ID;

in response to the transmission of the indication, receiving, via the communication interface, a further browse request from the remote computing device; and in response to receiving the further browse request, transmitting, via the communication interface, a further response indicative of the actual content of the memory structure.

6. The method of claim 5, further comprising transmitting a refresh command to the remote computing device to trigger the remote computing device to refresh an associated remote display such that the associated remote display replaces an empty memory structure list with a populated memory structure list.

7. The method of claim 5, further comprising:
rendering an authentication interface at a display associated with the computing device; and
receiving data to allow or deny access of the remote computing device, the data received from an input device associated with the computing device.

8. The method of claim 5, further comprising one or more of:
storing an identifier of the remote computing device on a white list at a memory module when the remote computing device is one or more of granted access in the authentication process and granted access in a previous authentication process; and,
storing an identifier of the remote computing device on a black list at the memory module when the remote computing device is denied access.

9. A non-transitory computer program product, comprising a computer usable medium having a computer readable program code adapted to be executed by a computing device to cause the computing device to control access by:
receiving, at the computing device, a browse request from a remote computing device to browse a memory structure including content files;
initiating an authentication process of the remote computing device to determine whether access of the remote computing device to the content files is to be granted or denied;

in parallel to initiating the authentication process, prior to the remote computing device being authenticated, transmitting a response to the remote computing device indicative that the memory structure is empty of the content files, regardless of actual content of the memory structure, wherein the response is transmitted within a specified timeout period of the remote computing device;

granting access of the remote computing device to the content files;

in response to the remote computing device being granted access, transmitting, via the communication interface, an indication that the memory structure has changed, wherein the indication comprises at least one of a system update ID and a container update ID;

in response to the transmission of the indication, receiving, via the communication interface, a further browse request from the remote computing device; and in response to receiving the further browse request, transmitting, via the communication interface, a further response indicative of the actual content of the memory structure.

10. The non-transitory computer program product of claim 9, wherein the instructions, upon execution, further cause the computing device to control access by transmitting a refresh command to the remote computing device to trigger the remote computing device to refresh an associated remote display such that the associated remote display replaces an empty memory structure list with a populated memory structure list.

11. The non-transitory computer program product of claim 9, wherein the instructions, upon execution, further cause the computing device to control access by:
rendering an authentication interface at a display associated with the computing device; and
receiving data to allow or deny access of the remote computing device, the data received from an input device associated with the computing device.

12. The non-transitory computer program product of claim 9, wherein the instructions, upon execution, further cause the computing device to control access by one or more of:
storing an identifier of the remote computing device on a white list at a memory module when the remote computing device is one or more of granted access in the authentication process, and granted access in a previous authentication process; and,
storing an identifier of the remote computing device on a black list at the memory module when the remote computing device is denied access.

* * * * *